United States Patent
Johnson et al.

(10) Patent No.: US 6,341,146 B1
(45) Date of Patent: Jan. 22, 2002

(54) PHASE-SHIFT-KEYING DEMODULATOR AND DEMODULATION METHOD USING A PERIOD-WIDTH WINDOWING TECHNIQUE

(75) Inventors: Robert E. Johnson, Randolph; George P. Vella-Coleiro, Summit, both of NJ (US)

(73) Assignee: Lucnet Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/181,810

(22) Filed: Oct. 29, 1998

(51) Int. Cl.[7] .......................... H03D 3/18; H04L 27/221
(52) U.S. Cl. ...................... 375/329; 375/324; 375/316; 329/304; 329/309; 329/305; 329/306
(58) Field of Search ................................. 375/329, 376, 375/327, 279, 280, 282, 283, 330, 333, 316, 324; 329/304, 307, 309, 310, 305, 306

(56) References Cited

U.S. PATENT DOCUMENTS

| | | | | |
|---|---|---|---|---|
| 5,272,447 A | * | 12/1993 | Furuya et al. | 329/304 |
| 5,506,873 A | * | 4/1996 | Suzuki | 375/324 |
| 5,757,868 A | * | 5/1998 | Kelton et al. | 375/360 |

* cited by examiner

Primary Examiner—Chi Pham
Assistant Examiner—Dung X. Nguyen

(57) ABSTRACT

A demodulator demodulates a PSK communications signal using a synchronizer, a period window detector, and a logic device. The synchronizer provides a transition signal representing reference edges of the communication signal. The period window detector, coupled to the synchronizer, establishes a time interval based on the period of the transition signal. Finally, the logic device, having logic inputs coupled to the outputs of the period-window detector, yields a logic output signal. The demodulator preferably includes a carrier boundary detector for framing messages and minimizing noise detection in a manner that permits signal strength measurements over a wide dynamic range.

25 Claims, 11 Drawing Sheets

PHASE-SHIFT-KEYING DEMODULATOR AND DEMODULATION METHOD USING A PERIOD-WIDTH WINDOWING TECHNIQUE

FIELD OF THE INVENTION

The present invention relates generally to demodulators for communications equipment and, in particular, to demodulators for phase-shift-keyed or analogous communications signals.

BACKGROUND OF THE INVENTION

Phase-shift-keying (PSK) demodulators often have used inflexible fixed-function circuitry limited to particular applications. Consequently, new or different applications have required designing new circuitry for particular applications, which tended to increase costs of the demodulators.

Application Specific Integrated Circuits (ASIC's) and phase locked loops (PLL's) are illustrative examples of fixed-function circuitry used in PSK demodulators. An ASIC may comprise a dedicated algorithm to recover the message content of a received signal. Similarly, a PLL comprises an oscillator control mechanism that limits the practical frequency range of demodulators. While the frequency range of a PLL circuit may be enhanced by using adjustable components or replacing components, such hardware changes may require disassembly of the PLL circuit, its housing, or other disruptive measures. Thus, a need exists for a cost-effective demodulator that is readily apposite to a wide assortment of applications.

One problem with certain existing demodulators is insufficient immunity to spurious noise. Noise may be caused by a prodigious variety of man-made sources that intentionally or unintentionally radiate electromagnetic energy within a frequency range affecting a PSK carrier frequency of interest. Typical sources of noise include telecommunications equipment, electric motors, generators, and internal combustion engines, among others. As referred to herein, inter-message noise refers to electromagnetic noise energy between PSK messages. Inter-message noise may be modeled as a randomly occurring electromagnetic signal with an amplitude characterized by a probability density function. Inter-message noise tends to degrade reception of PSK messages and interpretation of demodulated data. A demodulator with insufficient immunity to noise is characterized by an unacceptably high frequency of false phase shift detections. To increase immunity to noise, some electronic manufacturers have attenuated the received signal at the PSK demodulator. However, an unwanted side effect of such attenuation is reduced sensitivity of the demodulator, which may make weaker received signals incapable of being properly detected. Thus, a need exists for a demodulator which has suitable immunity to noise without unduly sacrificing sensitivity. A need also exists for a demodulator with minimal attenuation levels suitable for obtaining received signal strength indicator (RSSI) measurements over the broadest possible range at the demodulator.

SUMMARY OF THE INVENTION

In accordance with the invention, a demodulator reduces or eliminates inter-message noise which would otherwise degrade the reception or interpretation of demodulated data. The demodulator reduces or eliminates noise based upon a period-width windowing evaluation of a communications signal to accurately time the presence of a message interval and to disable a demodulator output outside of the message interval. The period-width windowing evaluation identifies phase shifts in the communications signal as deviations from an adjustable time window, called a period-width window. The period-width window is readily adjustable to accommodate different carrier frequencies because the demodulator is well-suited for fabrication using programmable digital logic circuitry.

The demodulator may be readily incorporated into receivers or transceivers to reduce or eliminate inter-message noise. In addition, the demodulator contributes toward maximizing receive sensitivity of its host receiver by eliminating the potential need for an attenuator to reduce noise at the receiver. Consequently, the demodulator is well-suited for operation in tandem with a receive signal strength indicator to measure a broad dynamic range of signal strengths.

In accordance with the invention, a demodulator for demodulating a PSK communications signal synchronizes the demodulator with the communication signal by generating a transition signal modulated to represent reference edges of the communication signal. The demodulator measures a time interval between the reference edges of the communications signal and establishes a durational state associated with the measured time interval. The durational state is used to logically derive a logic output signal indicating the presence or absence of a phase shift in the communications signal.

The communications signal preferably includes a phase-shift modulated state and a generally unmodulated carrier state. The demodulator is adapted to detect the state of the communications signal and control the enablement of the demodulator output based upon whether the communications signal is in the phase-shift modulated state or the unmodulated state. Appropriately controlling the enablement of the demodulator reduces or eliminates noise reception of inter-message noise.

The demodulator of the invention is preferably manufactured by using only minimal discrete components and basic printed circuit board (PCB) fabrication techniques. The demodulator is readily implemented with flexible architecture, known as a field programmable gate array (FPGA) technology. An FPGA-based demodulator may have a lower production cost than fixed-function demodulators if the FPGA demodulator is suited to a sufficiently large common pool of applications to meet manufacturing target volumes. For example, an FPGA demodulator may be programmed to account for drift of a carrier frequency or a different carrier frequency to maximize production volume; hence, reduce production costs.

DETAILED DESCRIPTION OF THE PREFERRED EMBODIMENT

Figure 1:
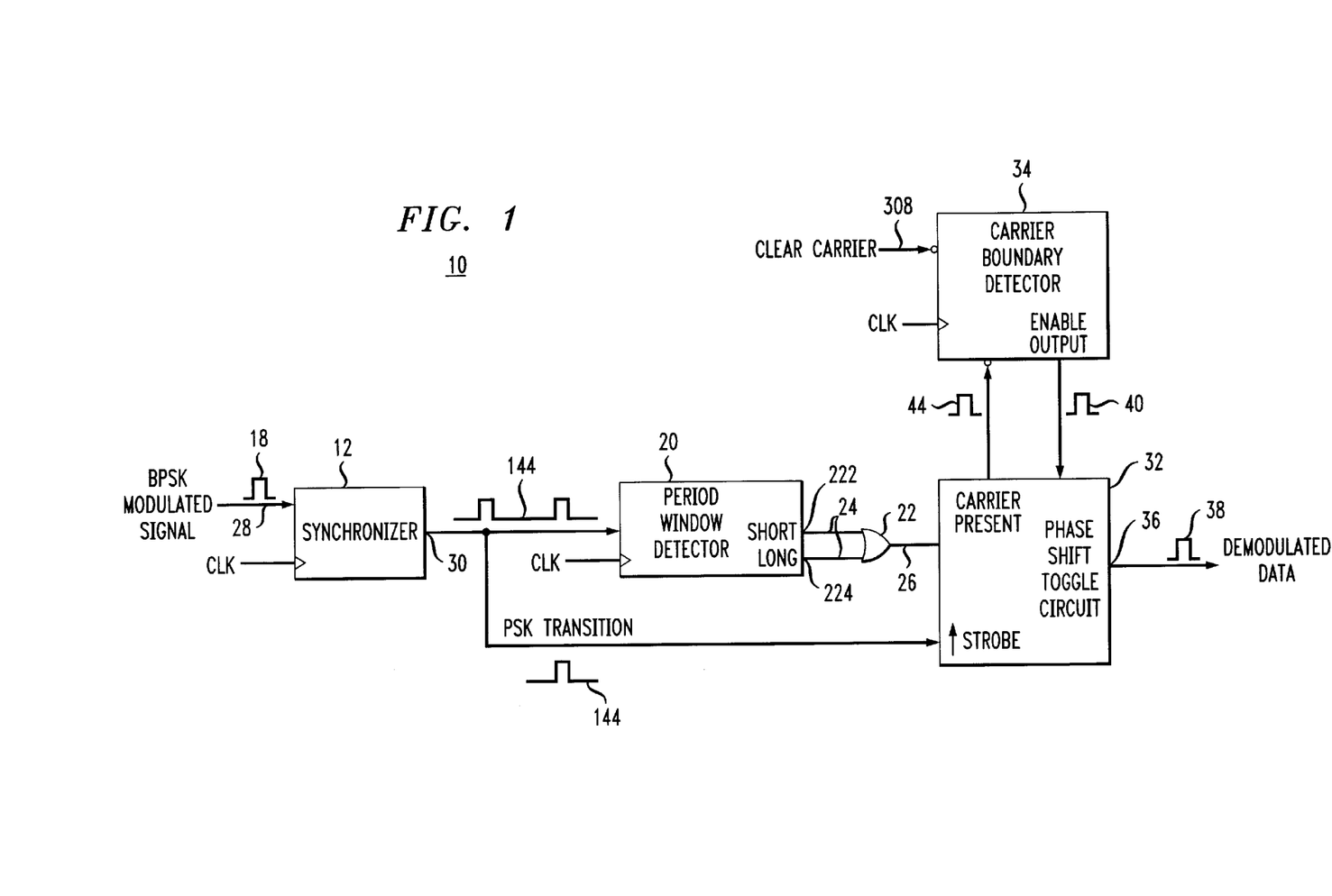
FIG. 1 is a block diagram of a demodulator in accordance with the invention.

In accordance with the invention, FIG. 1 illustrates a demodulator 10 for demodulating a communications signal 18. The demodulator 10 comprises a synchronizer 12 for providing a transition signal 144 representing reference edges of the communication signal 18; a period-window detector 20 coupled to the synchronizer 12, for measuring a time interval between reference edges based on the transition signal 144; and a logic device 22 having logic inputs 24 coupled to the outputs of the period-window detector 20 and yielding a logic output signal 26 indicative of the presence or absence of a phase shift in the communications signal. The foregoing components of the demodulator 10 are well-suited for fabrication using conventional commercially available digital logic circuitry or programmable digital logic circuitry.

The synchronizer 12 includes a synchronizer input 28 for accepting a communications signal 18 and a synchronizer output 30 for providing a transition signal 144 representing reference edges of the communications signal 18. A period-window detector 20 is coupled to the synchronizer 12 for receiving the transition signal 144. The period-window detector 20 measures a time interval between reference edges based on the transition signal 144. The period-window detector 20 has output signals indicative of durational states of the measured time interval. A logic device 22 has logic inputs 24 coupled to the outputs of the period-window detector 20. The logic device 22 yields a logic output signal 26 indicative of the presence or absence of a phase shift in the communications signal 18.

In a preferred embodiment illustrated in FIG. 1, the communications signal 18 includes a phase-shift modulated state and a generally unmodulated carrier state. The communications signal 18 optimally is a phase-shift-keying signal (PSK) such as a binary phase-shift-keying (BPSK) signal. The demodulator 10 is well-suited for demodulating binary phase-shift-keying (BPSK) signals, although the demodulator 10 may operate on other PSK modulation schemes or variants of PSK modulation schemes.

The demodulator 10 further preferably comprises a phase shift toggle circuit 32 connected to the logic device 22 and a carrier boundary detector 34 connected to the phase shift toggle circuit 32. The phase shift toggle circuit 32, the logic device 22, and the carrier boundary detector 34 may be readily fabricated using well-known digital logic integrated circuits or components. The phase shift toggle circuit 32 is adapted to receive the transition signal 144 and the logic output signal 26. The phase shift toggle circuit 32 provides demodulated data 38 at a toggle output 36. The carrier boundary detector 34 is adapted to detect the unmodulated carrier state and control the enablement of the toggle output 36 based upon the communications signal 18 being in the phase-shift modulated state or the unmodulated carrier state.

The carrier boundary detector 34 has a clear carrier flip-flop input 308 for resetting the carrier boundary detector 34. The carrier boundary detector 34 accepts a carrier present input signal 44 from the phase shift toggle circuit 32 and provides an enable output signal 40 to the phase shift toggle circuit 32. The carrier present input signal 44 has a logic state indicative of the presence or absence of an unmodulated state (i.e. carrier only state). The enable output signal 40 provides a logic state generally indicative of the presence or absence of a message interval 52, an end portion of a leading carrier interval 50, and a beginning portion of a trailing carrier interval 54. In practice, the demodulator 10 may be manufactured using only minimal discrete components and basic printed circuit board (PCB) techniques, wherein the synchronizer 12, the period-window detector 20, the logic device 22, the carrier boundary detector 34, and the phase shift toggle circuit 32 may be embodied as field-programmable gate array elements.

Figures 2A, 2B:
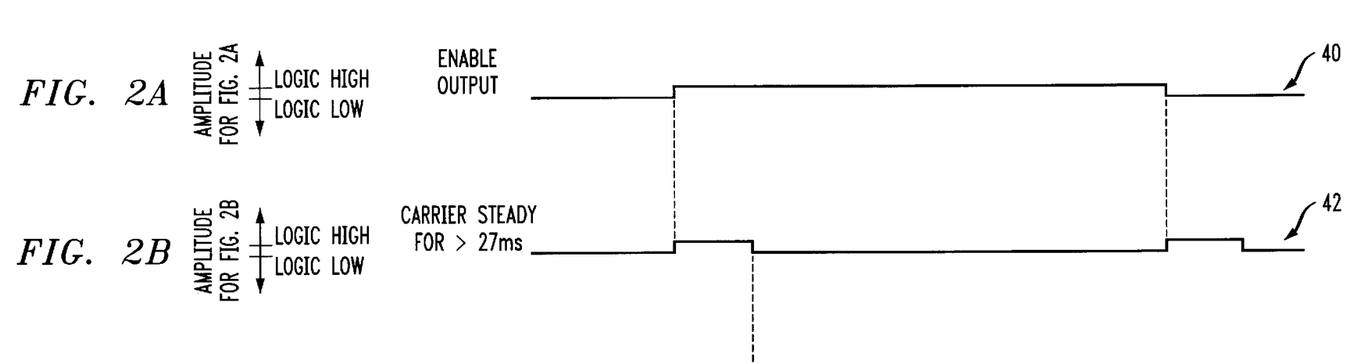
FIG. 2A through FIG. 2E are graphs of amplitude versus time for various signals associated with the demodulator of FIG. 1.
Figure 2C:
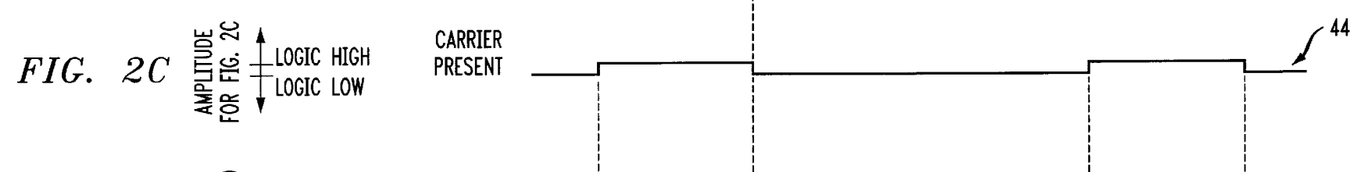
Figure 2D:
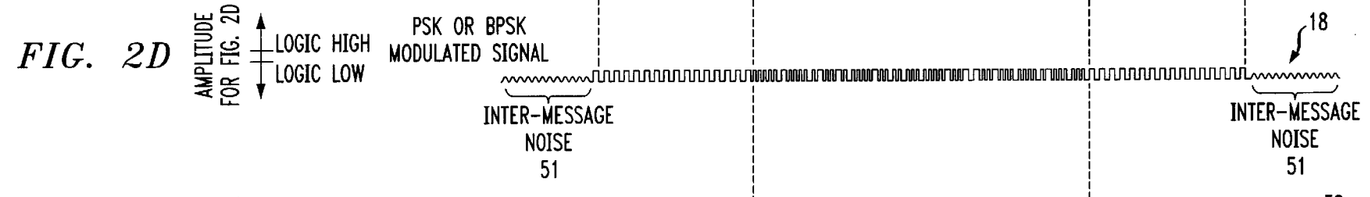
Figure 2E:
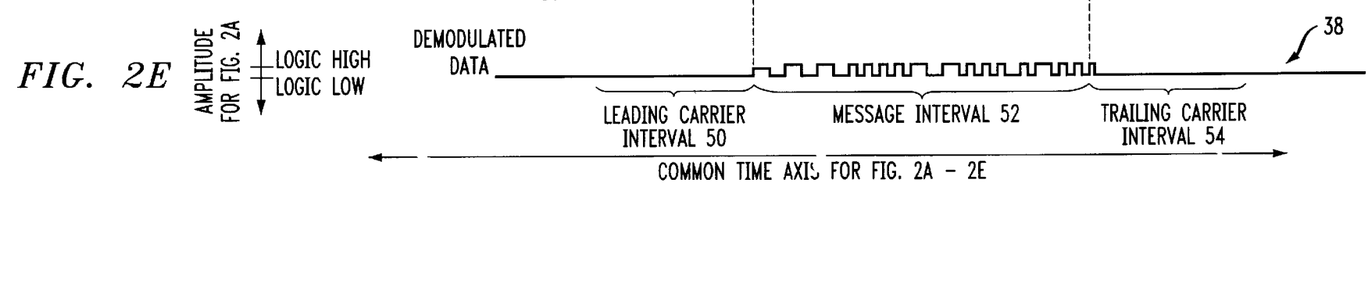

FIG. 2A through FIG. 2E show the timing relationship between various waveforms associated with the demodulator 10, including the enable output signal 40 (FIG. 2A), carrier steady-state signal 42 (FIG. 2B), carrier present signal 44 (FIG. 2C), communications signal 18 (FIG. 2D), and demodulated data 38 (FIG. 2E). The dashed lines indicate the synchronization of the signals between different figures of FIG. 2A through FIG. 2E. The horizontal axis represents a common time axis for FIG. 2A through FIG. 2E, while each of the vertical axes represents signal amplitude in one corresponding figure.

In FIG. 2D, a typical PSK-modulated communications signal 18 is illustratively corrupted by noise during an inter-message noise interval 51 between adjacent message intervals 52. Inter-message noise refers to unwanted electromagnetic energy present between PSK message intervals 52. Inter-message noise may be modeled as a randomly occurring electromagnetic energy, within a frequency range affecting the communication signal 18, with an amplitude characterized by a probability density function. In FIG. 2E, the demodulated data 38 is shown including a leading carrier interval 50, a message body 52, and a trailing carrier interval 54 without the unwanted effects of inter-message noise 51 in accordance with the demodulator 10. These signals and the various intervals will be described later in more detail.

Synchronizer

Figure 3:
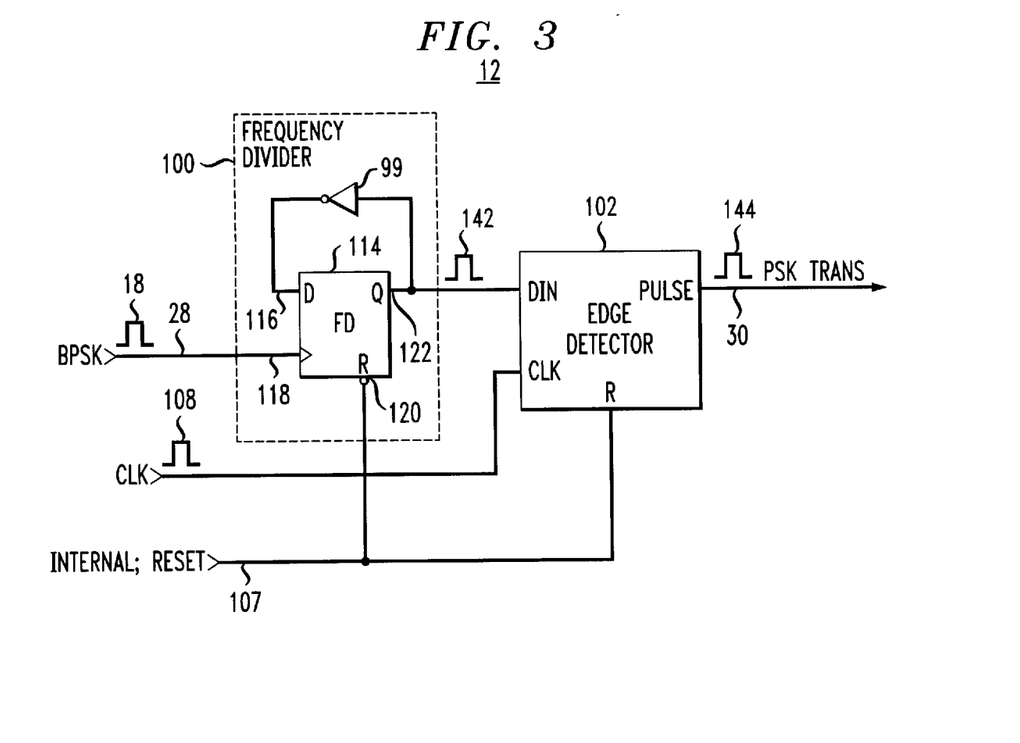
FIG. 3 is a schematic which shows an illustrative embodiment of the synchronizer of FIG. 1.

Referring to FIG. 3, the synchronizer 12 preferably comprises a frequency divider 100 cooperatively coupled to an edge detector 102. The edge detector 102 accepts a reference clock signal 108. The synchronizer 12 includes a synchronizer input 28 for accepting a communications signal 18 and a synchronizer output 30 for transmitting a transition signal 144 to the period window detector 20. An internal reset input 107 is preferably provided for the synchronizer 12 and to edge detector 102.

The frequency divider 100 divides the original frequency of the communications signal 18 (i.e. PSK modulated signal) to yield a divided frequency for the edge detector 102. The divisor is preferably two, although other configurations may use other positive integers.

The frequency divider 100 generally comprises a digital logic circuit for dividing a radio frequency signal, such as the communications signal 18. The frequency divider 100 preferably includes a flip-flop 114 arranged in a toggling mode. Here, in FIG. 3 the flip-flop 114 comprises a D-type flip-flop which includes a D input 116, an edge-triggered input 118, an active low reset input 120, and a Q output 122.

Although a D-type flip-flop is described herein, any type of flip-flop or logic storage device capable of a toggling mode may be used to make the frequency divider 100. For the D-type flip-flop, the Q output 122 is first inverted by an inverter 99 and then coupled as feedback to the D input 116. Therefore, a divided output signal 142 at the Q output 122 toggles at one-half the frequency of the D input 116.

Figure 4:
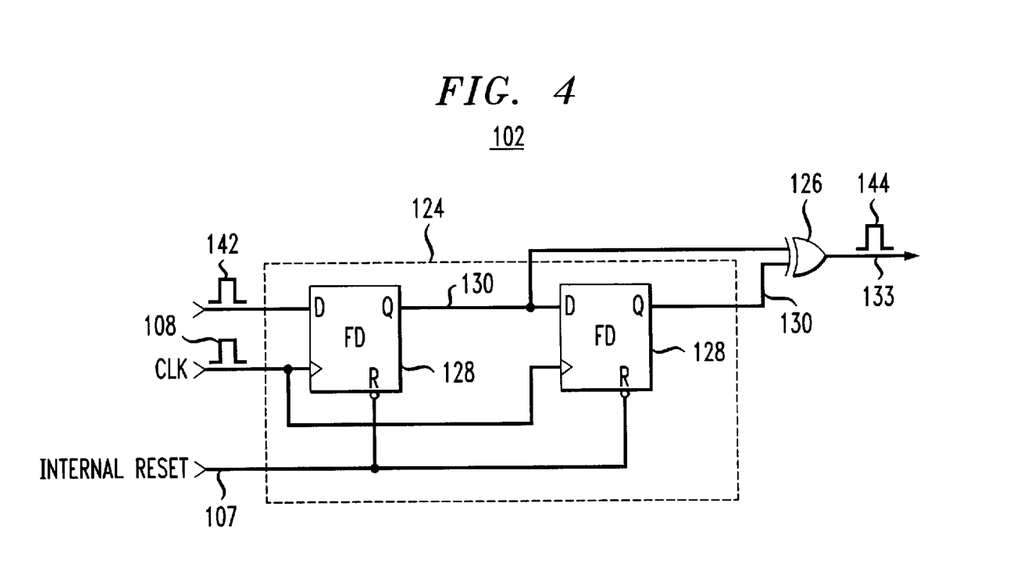
FIG. 4 is an illustrative schematic of the edge detector block of FIG. 3.

The edge detector 102 generally comprises a digital logic circuit for providing a timing relationship between transitions in a radio frequency signal, such as the communications signal 18. FIG. 4 shows an illustrative embodiment of the edge detector 102, in detail, in which the edge detector 102 includes a shift register 124 in combination with a exclusive "OR" gate 126. The divided output signal 142 of the D-type flip-flop 114 and a clock output signal 108 are coupled to the shift register 124. The shift register 124 may comprise two flip-flops 128 cascaded in the manner shown in FIG. 4. If D-type flip-flops 128 are used as illustrated, the Q outputs 130 of the cascaded flip-flops 128 are preferably exclusively OR'ed such that an output of an exclusive OR gate 126 provides a transition signal 144. The output of the exclusive OR gate 126 represents a pulse output 133 of the edge detector 102. The edge detector 102 includes an internal reset terminal 107 for resetting the edge detector 102.

In alternate embodiments, other types of flip-flops may be used to yield a shift register 124 or commercially available shift registers may be used.

Figure 5A:
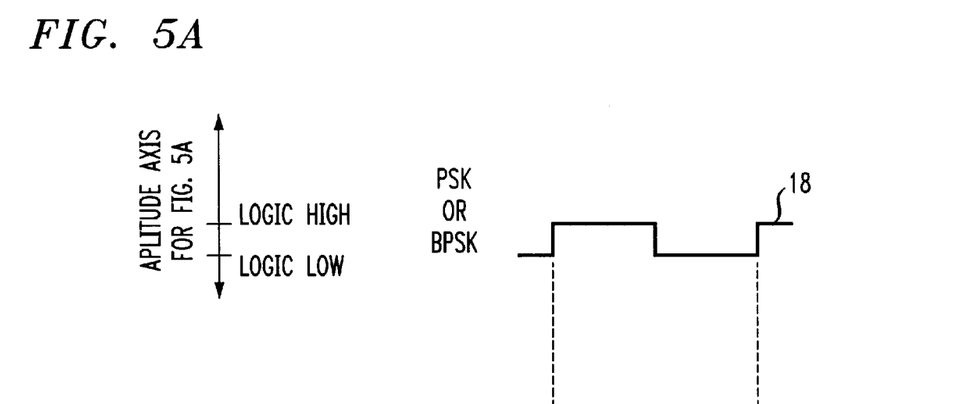
FIG. 5A through FIG. 5C are illustrative graphs of amplitude versus time for various signals associated with the synchronizer of FIG. 3.
Figure 5B:
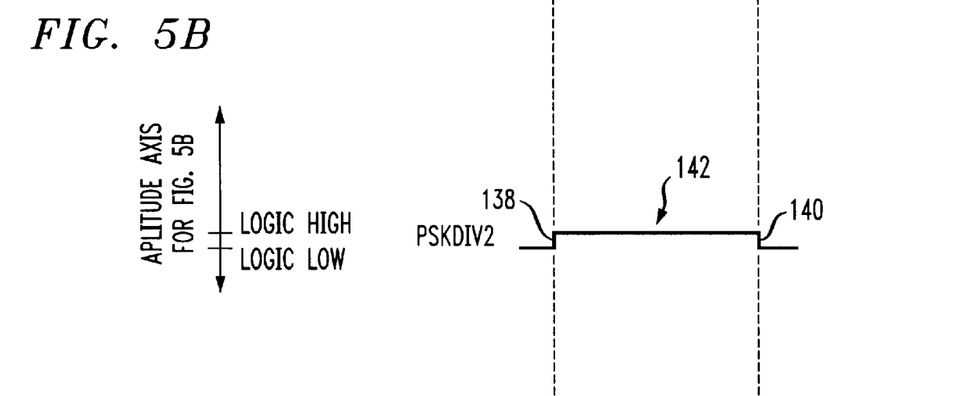

FIG. 5A depicts the communications signal 18 that is being applied to the synchronizer 12. The frequency divider 100 of synchronizer 12 divides the signal to obtain a divided signal 142 as shown in FIG. 5B, having a leading edge 138 and a trailing edge 140. The edge detector 102 of synchronizer 12 provides the transition signal 144 shown in FIG. 5C. The transition signal 144 preferably comprises a series of pulses 146 in which each pulse coincides with a reference edge, either a leading edge 138 or trailing edge 140 of divided signal 142, of the communications signal 18 after frequency division by the frequency divider 100.

FIG. 5B shows the divided signal 142 designated as PSKDIV2. The divided signal 142 is applied as an input to the edge detector 102. The output waveform from the exclusive OR gate 126 of the edge detector 102 at pulse output 133 is the transition signal 144 and is designated PSK_TRANS in FIG. 5C.

Figure 5C:
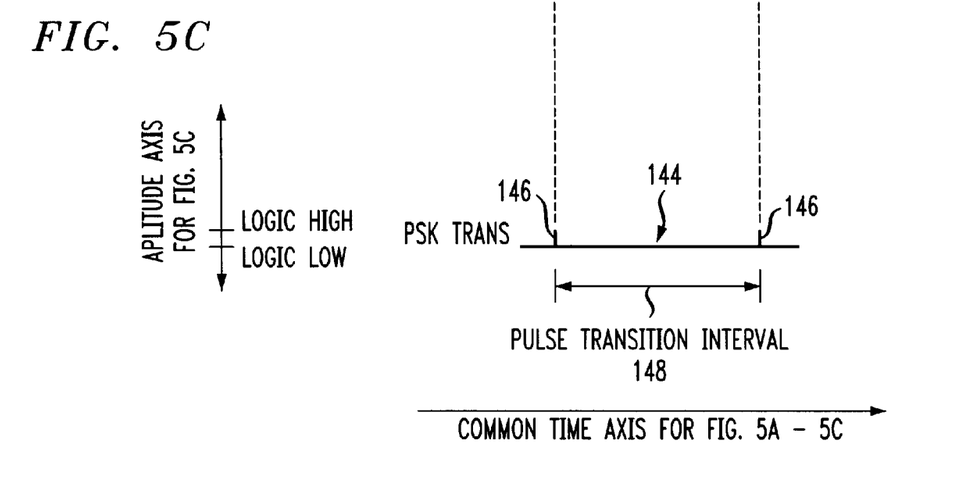

FIG. 5C shows the time between the pulses 146, which is called the pulse transition interval 148. The pulse transition interval 148 will generally vary with the instantaneous state of modulation of the communications signal.

The horizontal axis represents a common time axis for FIG. 5A through FIG. 5C. Each vertical axis in FIG. 5A through FIG. 5C shows the logic state of a signal in one corresponding figure.

Period Window Detector

Figure 6A:
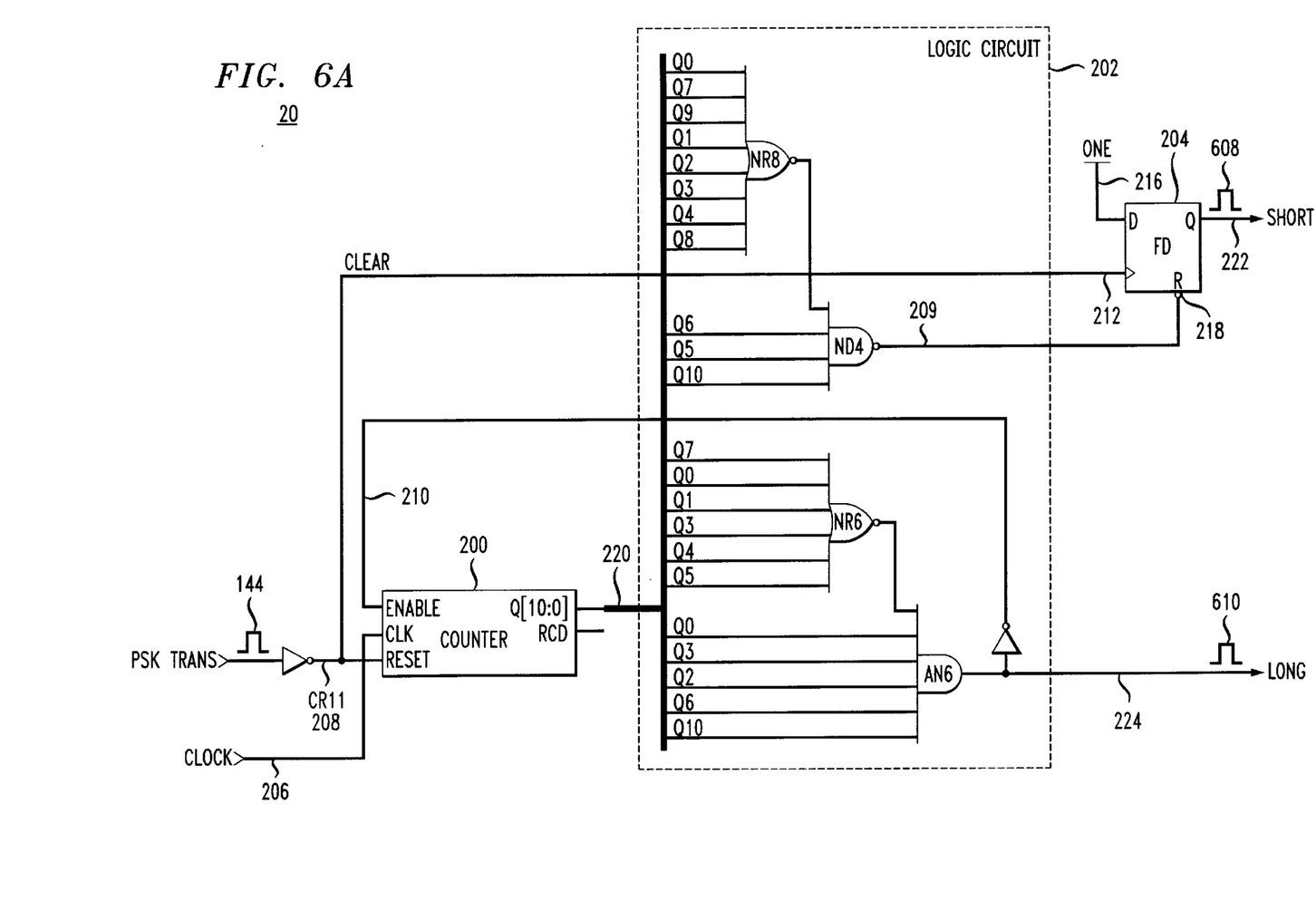
FIG. 6A is a schematic which shows an illustrative embodiment of the period-window detector of FIG. 1.

The period-window detector 20 generally comprises a digital logic circuit for comparing input timing information on a communications signal 18 to a reference period-window to determine the presence or absence of phase shift in the communications signal 18. Referring to FIG. 6A, the period-window detector 20 preferably comprises a counter 200 operatively connected to a logic circuit 202 and a flip-flop 204 operatively connected to the logic circuit 202. The counter 200 has a clock input 206, a counter input 208 (or reset input) for accepting the transition signal 144, an enable input 210 receiving a feedback signal from the logic circuit 202, and a counter output 220 coupled to the logic circuit 202. As illustrated in a preferred embodiment, the transition signal 144 is inverted prior to application to the counter 200.

The flip-flop 204 has an edge-triggered input 212 which is coupled to the inverted transition signal. Another input 216 of the flip-flop 204, illustratively designated as a D input for a D-type flip-flop 204, is fixed at a fixed logic state (i.e. high logic level). A reset input 218 of the flip-flop 204 is coupled to an output 209 of the logic circuit 202. The flip-flop 204 has a first output indicative of one of the durational states. The logic circuit 202 has a second output 224 which may be indicative of another one of the states.

The logic circuit 202 may be made from an arrangement of various multi-input logic gates, including NOR, NAND, AND, OR, or exclusive NOR gates. The illustrative example shown in FIG. 6A shows illustrative pin-outs between the logic gates and the counter 200.

In a preferred embodiment, the counter 200 comprises at least an 11-bit counter to generate a time window to determine if the intervals between successive transition pulses of the transition signal are short pulse intervals, normal pulse intervals, or long pulse intervals. Short pulse intervals and long pulse intervals represent phase shift in the communications signal 18 associated with the modulated state. Normal pulse intervals represent no phase shift in the communications signal 18 associated with the unmodulated state. Normal pulse intervals are arranged to fall within the predetermined window width of the period window detector 20. The time window of the counter 200 may readily be changed via software instructions from a CPU to accommodate demodulation of communication signals 18 having different frequencies, phase shift or phase distortion characteristics.

The transition signal 144 sets the flip-flop 204 and resets the counter 200 which then proceeds to count. If no new transition pulse 146 arrives before the counter 200 reaches a first minimum predetermined threshold time, then the flip-flop 204 is reset and the first output 222 (i.e. short) goes to a logic state (i.e. logic low) indicating that the period window detector 20 has not detected a short pulse interval, in the transition signal 144, as the durational state.

If no new transition pulse arrives before the counter 200 reaches a second maximum predetermined threshold time then the second output 224 (i.e. long) goes to a second logic state (i.e. high logic state) indicative of a long transition pulse as the durational state. In the illustrative example shown in FIG. 6A, a high logic state at the second output 224 disables the counter 200 so that the count is held until the next transition signal 144 arrives, both clearing and enabling the counter 200 for a new counting sequence. During a normal pulse interval, the transition pulse 144 arrives such that both the first output 222 and the second output 224 are simultaneously low during the arrival.

The first minimum predetermined threshold time and the second minimum predetermined threshold time are selected based upon the frequency tolerance of the clock (i.e. CLK) of the demodulator 10, the distribution of measurements caused by jitter, and the frequency tolerance of the carrier derived from the modulator. One illustrative source of jitter is a comparator which may be used to provide digitized PSK modulated data as input to the demodulator.

Figure 6B:
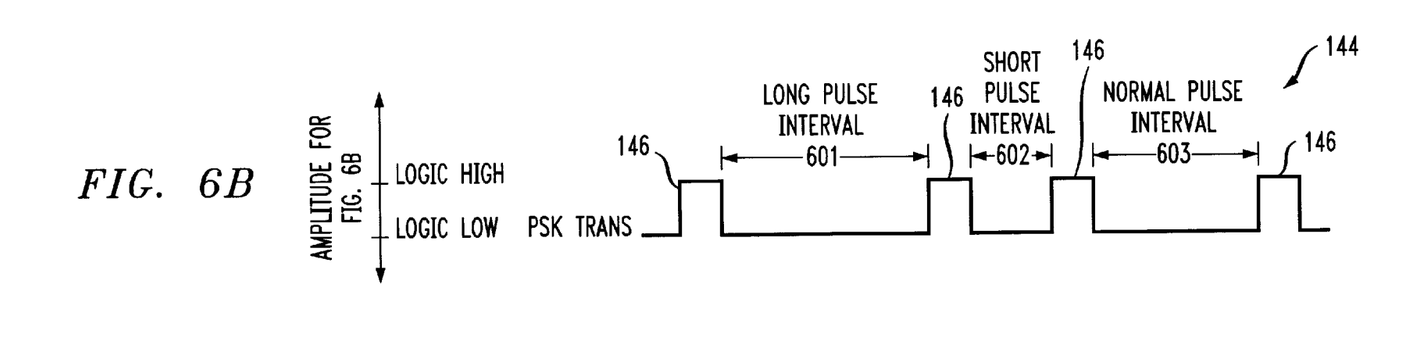
FIG. 6B through FIG. 6D are illustrative graphs showing a temporal relationship between a transition signal at an input to a period-window detector and short and long output signals at a first output and a second output, respectively.
Figure 6C:
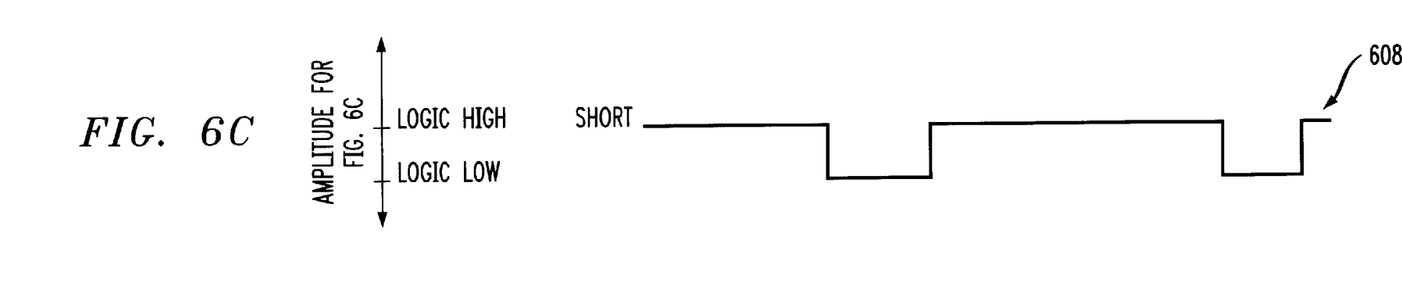
Figure 6D:
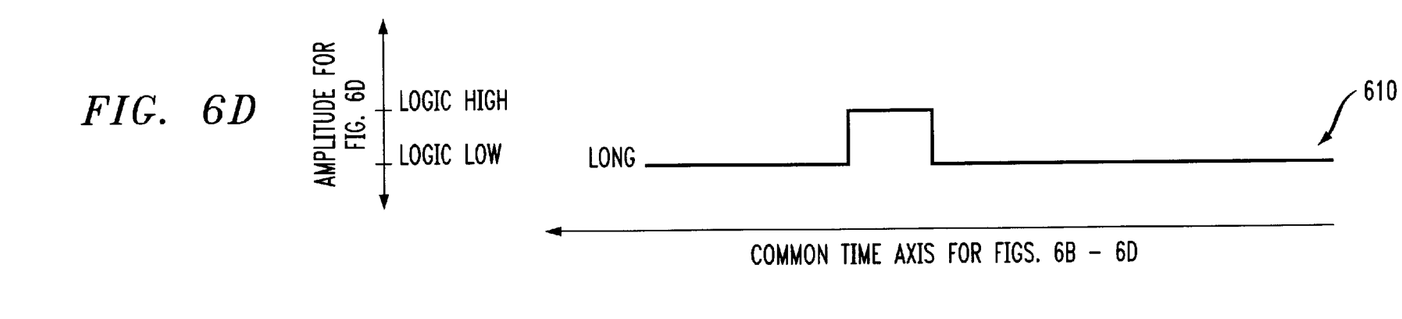

In FIG. 6B through FIG. 6D, an illustrative transition signal 144 at an input to a period-window detector 20 is temporally related to short and long output signals at a first output 222 and a second output 224, respectively. The signals in FIG. 6B through FIG. 6D are plotted with amplitudes of each signal on separate vertical axes and a common time scale on the horizontal axis. While the illustrative transition signal 144 shows pulses 146 in a particular sequence of a long pulse interval 601, a short pulse interval 602, and a normal pulse interval 603; the short, normal and long pulse intervals may occur in any order and any type of interval may occur with any frequency.

The logic states of the short output signal 608 and the long output signal 610 indicate whether or not the communications signal 18 has been phase-shifted or modulated. The relative logic states of the transition signal 144, the short output signal 608, and the long output signal 610 may be expressed as a truth table in which the following states are present: (1) The short output signal 608 may be low and the long output signal 610 may be low for normal pulse intervals 603—indicating no phase shift. (2) The short output signal 608 may be low and the long output signal 610 may be high for long pulse intervals 601—indicating phase shift. (3) The short output signal 608 may be high and the long output 610 may be low for short pulse intervals 602—indicating phase shift. Nevertheless, a period-window detector 20 falling within the scope of this invention may be practiced by using other logic states and truth table relationships not expressly set forth herein.

Logic Device

The logic device 22 generally comprises a digital logic circuit for evaluating input logic states in accordance with a predetermined logic relationship or rule, and for providing a digital output consistent with the relationship or rule. The logic device 22 shown in FIG. 1 preferably comprises an OR gate or an equivalent logic circuit. However, in alternate embodiments the logic device 22 may comprise any logic structure or circuit capable of acting upon the durational states received from the period-window detector 20 to yield output information on the modulation of the communications signal 18.

As illustrated in FIG. 1, the logic device 22 has its inputs connected to the first output 222 and the second output 224 of the period-window detector 20. Here, the first output 222 of the period-window detector 20 represents a phase change of the communications signal 18 as manifested by a measured time interval less than a minimum predetermined threshold time. The second output 224 of the period window detector 20 represents a phase change of the communications signal 18 as manifested by a measured time interval being greater than a maximum predetermined threshold time. The minimum and the maximum predetermined threshold times are proportional to stability factors and tolerance associated with a carrier frequency of the communications signal 18. The second output 224 disables the counter 200 if the measured time interval is greater than a maximum predetermined threshold time.

In an alternate embodiment, the first output 222 and the second output 224 may be replaced by a single output representing two possible states: a modulated state (i.e. phase-shifted) and an unmodulated state.

In accordance with a preferred embodiment consistent with FIG. 1, if the communications signal 18 is in an unmodulated state, including a leading carrier interval 50 or a trailing carrier interval 54, then the logic output 26 of the logic device 22 is preferably low. On the other hand, if the communications signal 18 is in the modulated state, the logic output 26 may be high, indicating a phase shifted waveform. As soon as the logic device 22 changes states to indicate the reception of the modulated state (i.e. a phase shifted signal), a demodulated data output or toggle output 36 of the demodulator 10 is activated and ripe for reading or further processing.

Carrier Boundary Detector

Figure 7:
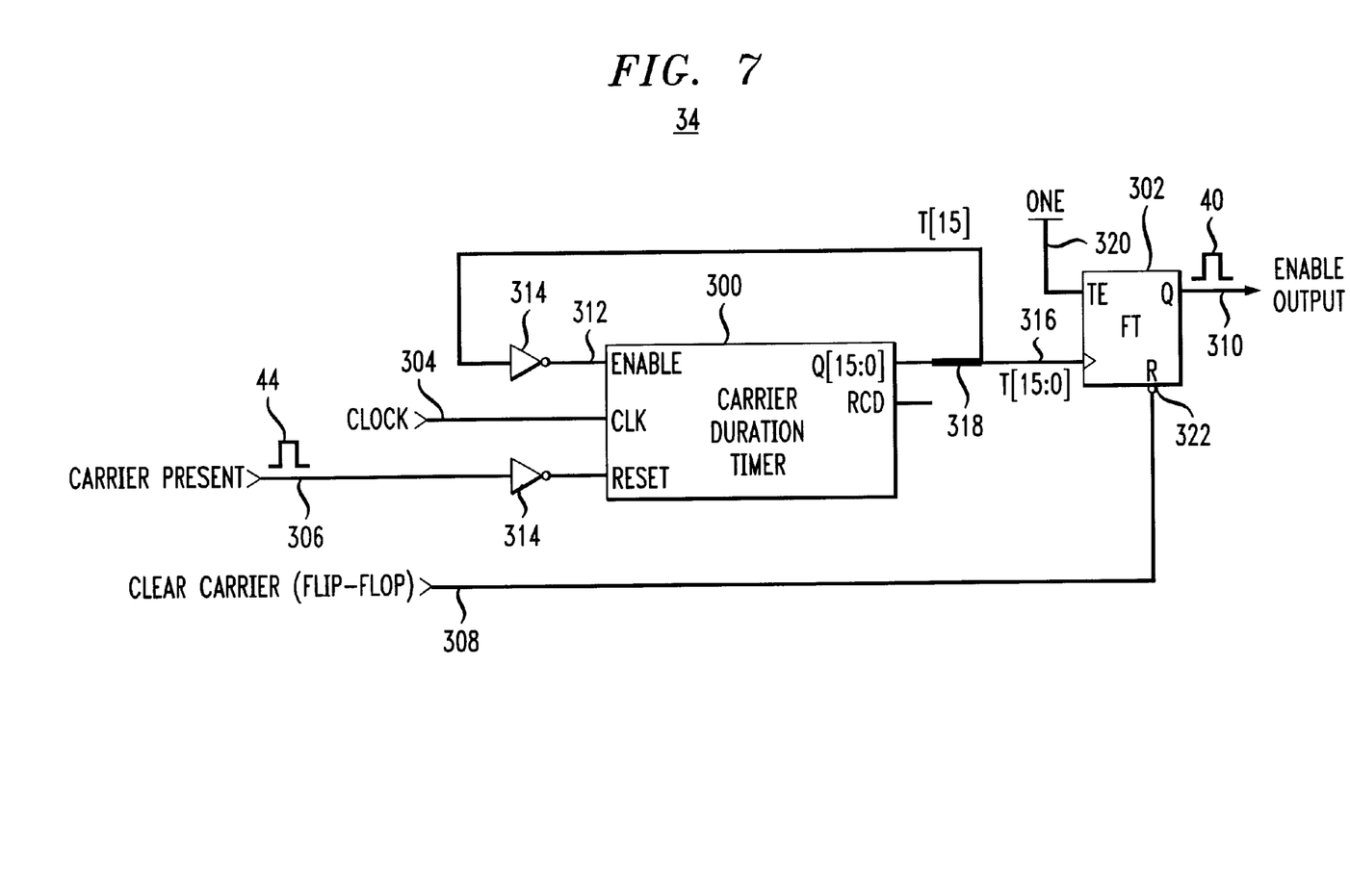
FIG. 7 is a schematic which shows an illustrative embodiment of the carrier boundary detector of FIG. 1.

The carrier boundary detector 34 generally comprises a digital logic circuit for evaluating a communications signal 18 to distinguish a message interval 52 from an inter-message noise interval 51. As shown in FIG. 7, the carrier boundary detector 34 preferably comprises a carrier duration timer 300 operatively connected to a logic storage device. The logic storage device preferably comprises a flip-flop 302, although in alternate embodiments the logic storage device may comprise a latch, a memory device, or, a register, for example. The carrier boundary detector 34 has a clock input 304, a carrier present input 306, a clear carrier flip-flop input 308, and an enabling output 310. The carrier present input 306 is preferably inverted prior to application to the reset input of the timer 300. One of the timer outputs 318 of the carrier duration timer 300 is preferably coupled to an enable input 312 of the carrier duration timer 300 via an inverter 314.

The toggle flip-flop 302 has an edge-triggered input 316 coupled to a timer output 318 of a timer, a logic input 320 labeled TE which is tied to a high logic state, a reset input 322, and a Q output 310. The clear carrier flip-flop input 308 is connected to the reset input 322 of the flip-flop 302. The Q output 310 provides the enable output signal 40.

A typical PSK modulated communications signal 18 may be corrupted by noise during an inter-message noise interval 51 (FIG. 2D) between messages. The noise in the inter-message noise interval 51 has a sufficient amplitude to negatively impact the performance of a demodulator without the beneficial action of the carrier boundary detector 34. The carrier boundary detector 34 eliminates, compensates for, suppresses, or otherwise reduces the deleterious effects of the inter-message noise 51 upon the demodulated output data during times between message intervals 52. Because the carrier boundary detector 34 functions as a noise eliminator, added attenuation for noise reduction purposes is rendered superfluous and the demodulator 10 is more responsive over a greater dynamic range of sensitivities than previously thought possible.

A typical PSK modulated message during the message interval is preceded and followed by an unmodulated interval. The carrier boundary detector 34 discriminates between a modulated state (i.e. mode) and an unmodulated state (i.e. mode) of the communications signal 18. The unmodulated state of the communications signal 18 may be merely a generally square wave without intentional phase shifting. As shown in FIG. 2D, the unmodulated state preferably includes a leading carrier interval 50, which precedes the modulated state for a first fixed predetermined duration and a trailing carrier interval 54 which follows the modulated state for a second fixed predetermined duration.

The leading carrier interval 50 and the trailing carrier interval 54 are preferably used for synchronization purposes to synchronize the decoding of modulated data in the message interval 52. The expiration of the first fixed predetermined duration indicates the imminent arrival time of the data or message body of the modulated state within the message interval 52. In contrast, the expiration of the second fixed predetermined duration indicates the imminent arrival time of potential inter-message noise 51 between adjacent message intervals 52. In practice, the first fixed predetermined duration and the second predetermined fixed duration may range from approximately 200 to 1,000 unmodulated cycles of the communication signal 18, although other ranges are possible for practicing the invention.

The carrier frequency boundary detector 34 initiates the carrier duration timer 300 having a starting time coincident with the beginning of the leading carrier interval 50 to prepare for reading the message body of the communications signal 18 in the modulated state upon the expiration of the timer 300. The carrier frequency boundary detector 34 also initiates the carrier duration timer 300 having a starting time coincident with a beginning of the trailing carrier interval 54 to prepare for temporarily disabling the demodulated output (i.e. toggle output 36) upon the expiration of the carrier duration timer 300. The temporarily disabling of the demodulated output between the expiration of the second predetermined duration and a start of a new first predetermined duration minimizes disruptive noise signals, which might otherwise be interpreted as corrupt data.

In a preferred embodiment of the carrier boundary detector 34 illustrated in FIG. 7, during the leading carrier interval 50 and the trailing carrier interval 54, the carrier signal present signal 44 remains low and the timer 300 is not held in reset. If no phase shifts are detected for the first fixed predetermined duration, the timer feedback bit of the carrier duration timer 300 goes high and toggles the enable output signal of the flip-flop 302 high, which in turn enables the demodulated PSK output of the demodulator 10. The feedback bit going high disables the carrier duration timer 300 from further counting. When the message body is being received, phase shifts repeatedly reset the carrier duration timer 300 so the feedback bit stays low.

When the message is complete and the pure carrier tone is again present, the feedback bit goes high after a second fixed predetermined duration and toggles the enable output signal to a low state. The low state disables the demodulated PSK signal output of the demodulator 10. In this way, random phase shifts (i.e. noise) occurring between genuine messages are filtered out. The clear carrier flip-flop input 308 may be pulsed low by a central processing unit (i.e. CPU) at a time between messages to guarantee that the enable output signal is low before the leading carrier tone is detected.

In a preferred embodiment in accordance with FIG. 7, a noise eliminator comprises the carrier boundary detector 34. The noise eliminator discriminates between a message interval 52 and an inter-message noise interval 51 of the communications signal by recognizing a trailing carrier interval 54 and a leading carrier interval 50 as temporal boundaries of the inter-message noise interval 51. The noise eliminator is adapted to generate an eliminator output for indicating whether or not the logic output signal 26 of the logic device 22 is usable or potentially corrupt by noise in the inter-message noise interval 51. The noise eliminator preferably comprises a carrier duration timer 300 for synchronizing the trailing and leading carrier intervals with the noise eliminator output, which may be represented as enable output signal 40. The demodulator output or toggle output 36 may be coupled to the noise eliminator output so that the eliminator output controls enablement of the demodulator output.

Phase Shift Toggle Circuit

Figure 8:
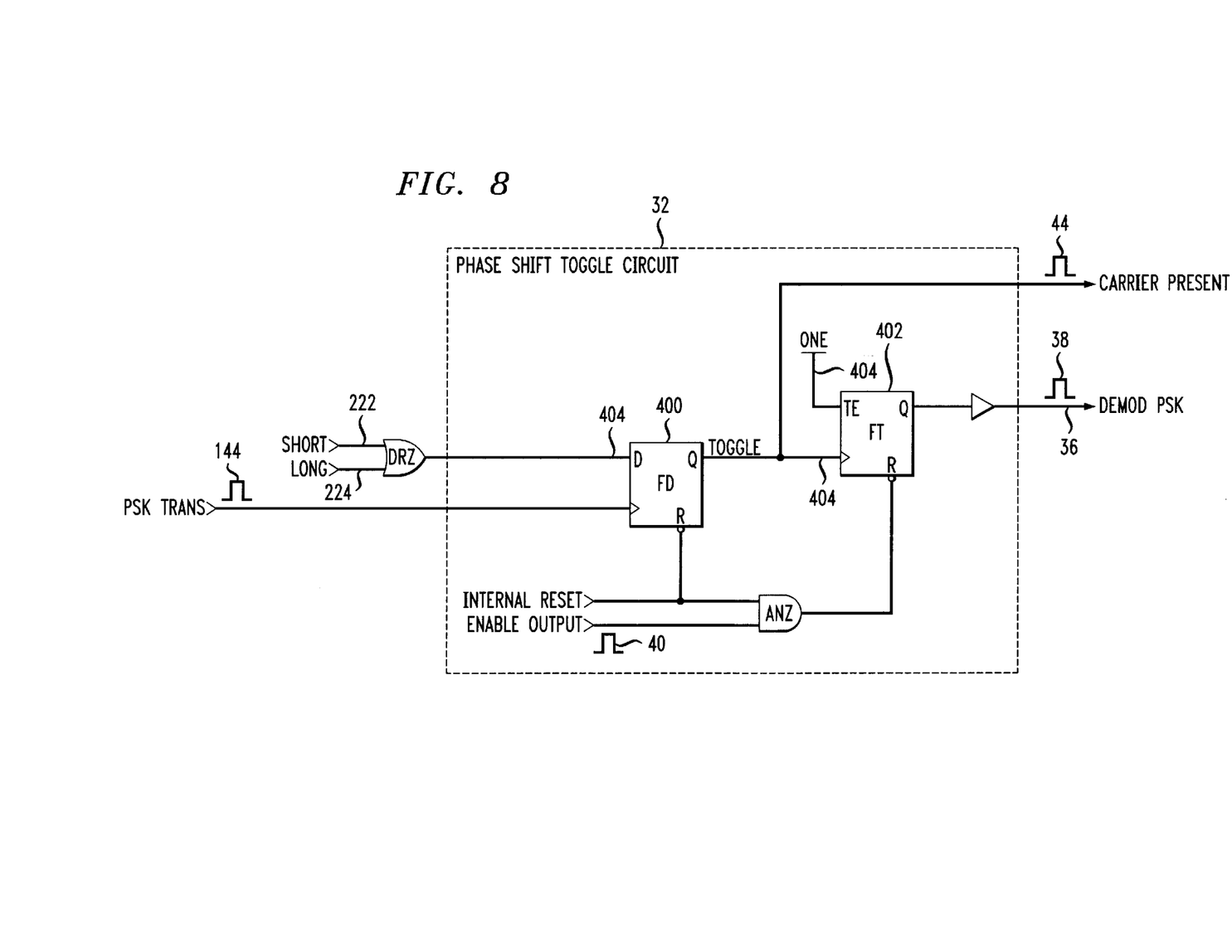
FIG. 8 is a schematic which shows an illustrative embodiment of the phase shift toggle circuit of FIG. 1.

The phase shift toggle circuit generally comprises digital logic circuitry for providing a demodulated data output based upon timing information on transitions in a communications signal 18 and logic input indicative of the present or absence of a phase shift in the communications signal 18. Referring to FIG. 8, the phase shift toggle circuit 32 preferably comprises a first flip-flop 400 cascaded with a second flip-flop 402. The first flip flop 400 has an edge-triggered input or strobe input for receiving the transition signal 144. The first flip flop 400 is arranged such that the data present on its input lines 404 just before a reference edge of the clock signal determines the output state of the first flip-flop 400 after the clock has pulsed. The second flip-flop 402 preferably comprises a T-type flip-flop arranged in a toggling mode to yield a demodulated data signal 38 at the demodulated signal output or toggle output 36.

In a preferred embodiment, when a phase shift has occurred in the communications signal 18, then either the first output 222 or the second output 224 of the logic device 22 will be high at the rising edge or a reference edge of the transition signal. The high logic level is latched into the first flip-flop 400. The rising edge then clocks the input to the second flip flop 402 to toggle the toggle output 36. The carrier present signal 44 has a high logic level if the previous PSK period was either a short pulse interval or a long pulse interval. The carrier present signal 44 then goes to the carrier boundary detector 34 and is used as described in the previous section.

Although the first output 222 and the second output 224 present useful information on the state of the communications signal 18, the demodulator 10 is primarily intended to yield demodulated data 38 at the toggle output 36 (i.e. demodulator output) from a PSK-modulated signal 18, a PSK-modulated signal, or a variant of a PSK-modulated signal, presented at the synchronizer input 28 (i.e. demodulator input).

Receiving System

Figure 9:
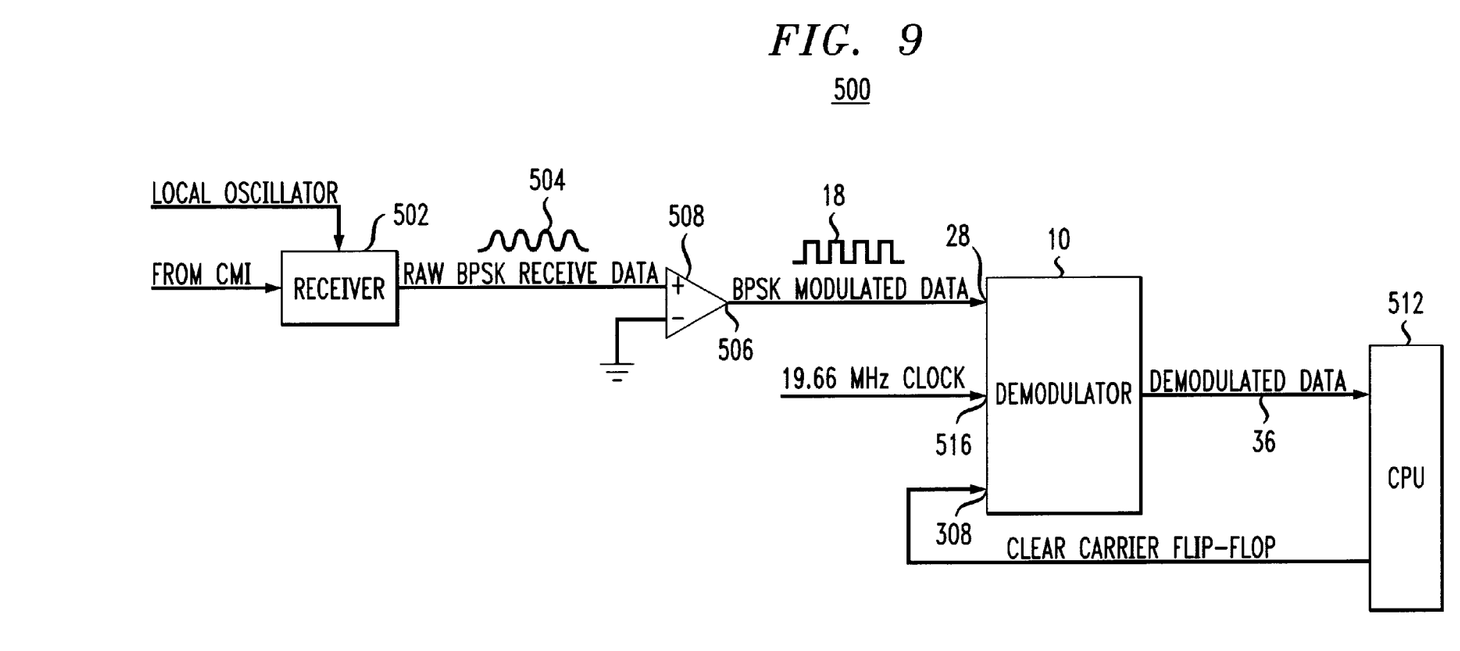
FIG. 9 shows a receiving system incorporating the demodulator of the invention.

FIG. 9 illustrates an application of the demodulator 10 of the invention in a receiving system 500. The demodulator 10 is connected to the output 506 of digitizing comparator 508. The digitizing comparator 508 accepts raw phase shifted modulated data 504 from an analog receiver 502 and converts the signal in a suitable digital logic level signals in a PSK data format for the demodulator 10. The inputs to the demodulator 10 include the synchronizer input 28, a clock signal input 516, and a clear carrier flip-flop signal input 308. The synchronizer input 28 receives a PSK-modulated signal 18 from the comparator 508. The output 36 includes demodulated data which is preferably coupled to a central processing unit 512, such as a general purpose computer that feeds the clear carrier flip-flop signal input 308 to the demodulator 10.

In accordance with the invention, the demodulator 10 may be flexibly used in a prodigious assortment of specific applications, such as being used in a receiving system 500, by merely changing software configurable features. The demodulator 10 is preferably designed so as to be field configurable by using field programmable gate array (FPGA) technology to embody the demodulator components. An FPGA-based demodulator may have a lower production cost than fixed-function demodulators if the FPGA demodulator is suited to a sufficiently large common pool of applications to meet manufacturing target volumes. For example, an FPGA demodulator may be programmed to account for drift of a carrier frequency or a different carrier frequency entirely by changing a window width and a window center of a period window, which is associated with a period window detector 20 of the invention.

The demodulator 10 of the present invention features a period-window detector 20 for establishing period-width windowing of a communications signal and a carrier boundary detector 34 for framing by carrier signal integration. The demodulator 10 of the present invention may be implemented with only minimal discrete components and basic printed circuit board (PCB) layouts. The carrier boundary detector 34 of the demodulator frames messages in a manner compatible with taking RSSI measurements over a wider dynamic range than demodulators using added attenuation.

In practice, the demodulator 10 is well-suited for use in communications systems that carry Personal Communication Services (PCS) over coaxial cable or hybrid networks. For example, the demodulator 10 may be used to demodulate status messages sent from a Cable Microcell Integrator (CMI), a hub site, a primary trunk, a switch point, a secondary trunk, or a subscriber device.

Operation

Figure 10:
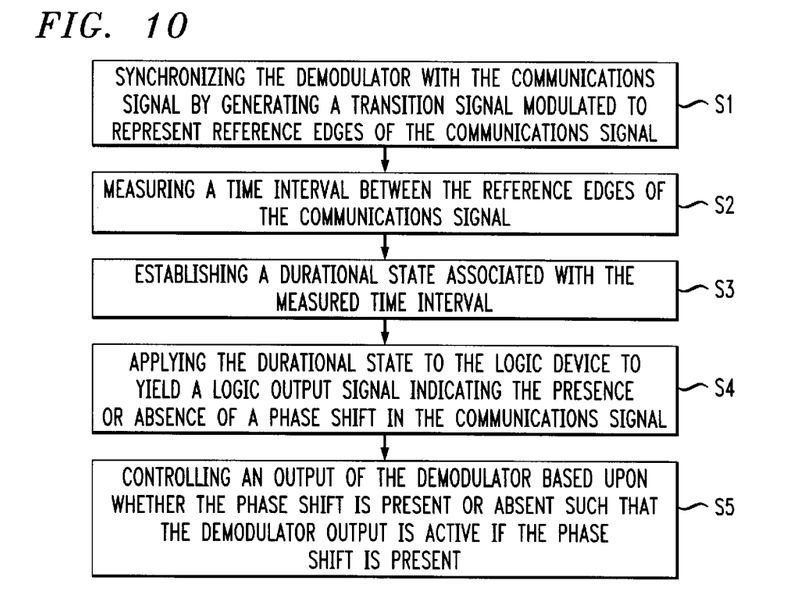
FIG. 10 through FIG. 12 are flow charts illustrating preferred methods of demodulating a communications signal pursuant to the present invention.

FIG. 10 is a flow chart illustrating a preferred method of demodulating a phase-shift keyed communications signal with a demodulator 10 having a logic device 22. In a first step S1, the demodulator is synchronized with a communications signal by generating a transition signal representing reference edges of the communications signal. In second step S2, a time interval between the reference edges of the communications signal is measured. In a third step S3, a durational state associated with the measured time interval is established. In step S4, the durational state is applied to a logic device to yield a logic output signal indicating the presence or absence of a phase shift in the communications signal. In step S5, a demodulator output of the demodulator is controlled based upon whether the phase shift is present or absent such that the demodulator output is active if the phase shift is present and otherwise inactive to reduce intermessage noise associated with communication signal.

Measuring the time interval in step S2, may further comprise measuring the time between successive transition signal pulses of the transition signal to establish the time interval.

Controlling the output of the demodulator in step S5 may further comprise detecting an unmodulated carrier state and controlling an output of the demodulator based upon whether the communications signal is in an unmodulated state or a modulated state. In particular, the demodulator may be muted for a portion of the unmodulated state to minimize noise degradation of the received communication signal.

Figure 11:
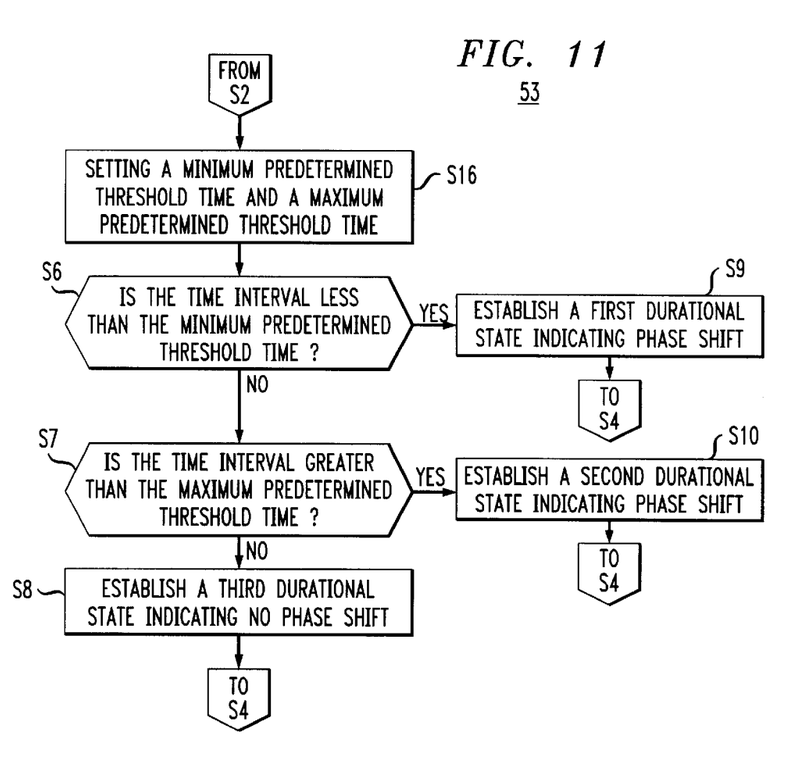

FIG. 11 shows an illustrative example of step S3 in more detail than FIG. 10. In step S16 of FIG. 11, a minimum predetermined threshold time and a maximum predetermined threshold time are set to define a time window for the period-window detector. The time window represents a time range which is proportional to a carrier frequency of the communications signal.

In step S6, the phase shift may be detected where the time interval previously measured in step S2 is less than a minimum predetermined threshold time set in step S16. If the measured time interval in step S6 is less than the minimum predetermined threshold, then a first durational state indicating phase shift is established in step S9 and the method continues at step S4. However, if the time interval previously measured in step S2 is greater than or equal to the minimum predetermined threshold set in step S16, then the method continues with step S7. In step S7, the phase shift may be detected where the time interval previously measured in step S2 is greater than a maximum predetermined threshold time set in step S16. If the phase shift is so detected in step S7, in step S10 a second durational state indicating a phase shift is established, and the method continues at step S4. Finally, if the measured time interval falls within the window between the minimum predetermined threshold and the maximum predetermined threshold previously set in S16, a third durational state indicating no phase shift is established in step S8 and the method continues at step S4.

Figure 12:
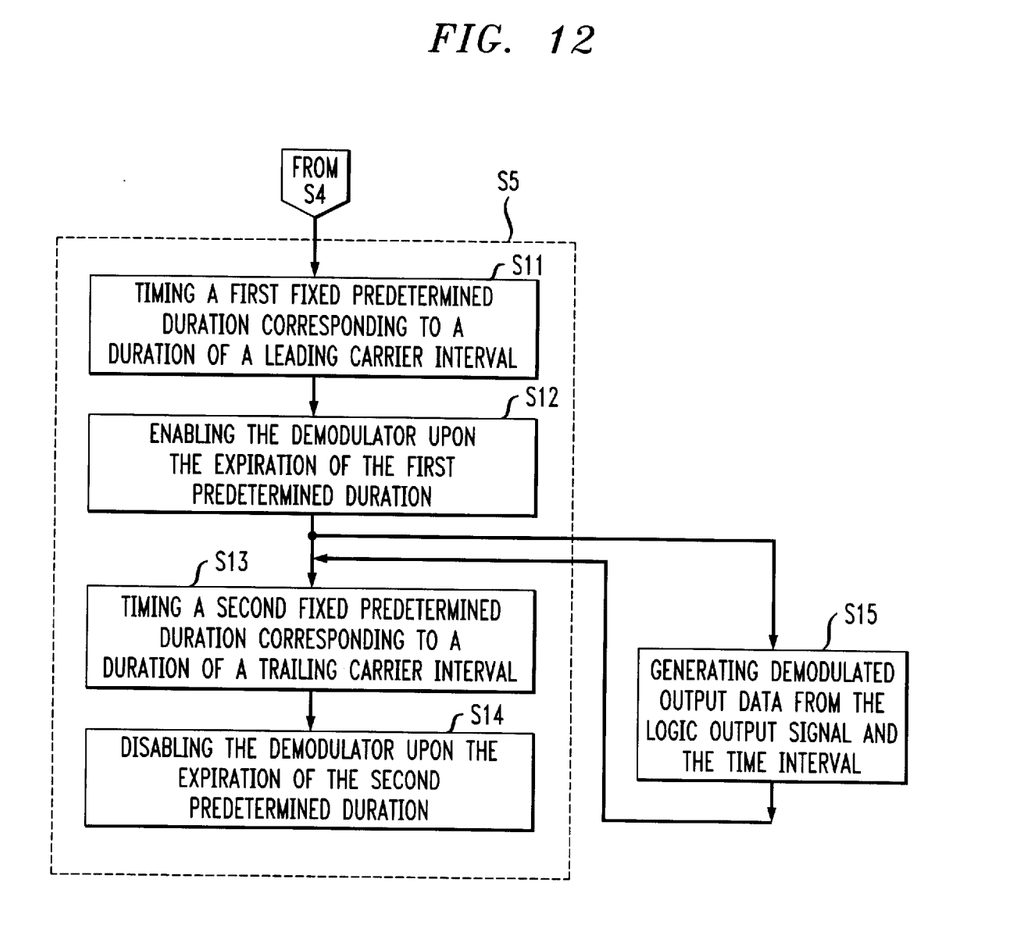

FIG. 12 shows an illustrative example of step S5 in more detail than FIG. 10. Accordingly, controlling the demodulator output in step S5 may include the step S11 of timing a first fixed predetermined duration corresponding to a duration of a leading carrier interval preceding the modulated mode to identify an imminent arrival time of a message body to prepare for enabling of a demodulator output of the demodulator. In step S12, the demodulator is then enabled upon the expiration of the first predetermined duration. If the demodulator is enabled in step S12, demodulated output data is generated from the logic output signal and the time interval in step S15. Once the message interval, containing the demodulated output, is complete, a second fixed predetermined duration corresponding to a duration of a trailing carrier interval is timed in step S13. The trailing carrier interval follows the modulated mode. The demodulator is disabled upon the expiration of the second predetermined duration in step S14. The disabling of the demodulator output in step S14 upon expiration of the second predetermined duration reduces the effects of noise associated with the communications signal. The demodulator output is preferably only temporarily disabled such that the output is reactivated for subsequent messages upon the expiration of the first predetermined duration.

This specification describes various illustrative embodiments of the demodulator and demodulation method of the invention. The scope of the claims are intended to cover various modifications and equivalent arrangements of the illustrative embodiments disclosed in the specification. Therefore, the following claims should be accorded the reasonably broadest interpretations to cover the modifications, equivalent structures, and features which are consistent with the spirit and the scope of the invention disclosed herein.

We claim:

1. A demodulator for demodulating a communications signal comprising:
    a synchronizer for accepting a communications signal and for outputting a transition signal representing reference edges of the communications signal;
    a period-window detector coupled to the synchronizer and receiving the transition signal, the period-window detector measuring a time interval between the reference edges of the communications signal based on the transition signal and providing outputs indicative of durational states of the measured time interval; and
    a logic device, having logic inputs coupled to the outputs of the period-window detector, yielding a logic output signal indicative of the presence or absence of a phase shift in the communications signal.

2. The demodulator according to claim 1 wherein the communications signal includes a phase-shift modulated state and a generally unmodulated carrier state, the demodulator further comprising:
    a phase shift toggle circuit for receiving the transition signal and the logic output signal and providing demodulated data at a toggle output; and
    a carrier boundary detector for detecting the unmodulated carrier state of the communications signal and controlling the enablement of the toggle output based upon whether the communications signal is in the phase-shift modulated state or the unmodulated state.

3. The demodulator of claim 2 wherein the carrier boundary detector enables the toggle output upon the communications signal being in the phase-shift modulated state.

4. The demodulator according to claim 1 further comprising:
   a noise eliminator for discriminating between a message interval and an inter-message noise interval of the communications signal by recognizing a trailing carrier interval and a leading carrier interval as temporal boundaries of the inter-message noise interval, the noise eliminator adapted to generate an eliminator output for indicating whether or not the logic output signal is usable or potentially corrupt by noise in the inter-message noise interval.

5. The demodulator of claim 4 further comprising a phase shift toggle circuit for receiving the transition signal and the logic output signal and providing demodulated data at a toggle output, the noise eliminator enabling the toggle output while the logic output signal indicates the presence of the phase shift.

6. The demodulator according to claim 4 wherein the noise eliminator comprises a carrier duration timer for synchronizing the trailing and leading carrier intervals with the eliminator output.

7. The demodulator according to claim 4 further comprising a demodulator output coupled to the eliminator output, the eliminator output controlling enablement of the demodulator output.

8. The demodulator according to claim 1 wherein the period-window detector comprises a counter, a logic circuit, and a flip-flop, the counter having a counter input for accepting the transition signal and having a counter output coupled to the logic circuit, the flip-flop having a first output indicative of one of the durational states, and the logic circuit having a second output indicative of another of the durational states.

9. The demodulator according to claim 8 wherein the first output of the logic circuit represents a phase change of the communications signal as manifested by a measured time interval less than a minimum predetermined threshold time, the minimum predetermined threshold time being proportional to a carrier frequency of the communications signal.

10. The demodulator according to claim 8 wherein the second output of the logic circuit represents a phase change of the communications signal as manifested by a measured time interval being greater than a maximum predetermined threshold time, the maximum predetermined threshold time based on a carrier frequency of the communications signal.

11. The demodulator according to claim 8 wherein the second output of the logic circuit disables the counter if the measured time interval is greater than a maximum predetermined threshold time.

12. The demodulator according to claim 1 wherein the transition signal represents a time interval between leading edges of the communications signal, and wherein the synchronizer divides the communications signal by a positive integer constant to derive the transition signal.

13. The demodulator according to claim 1 wherein the synchronizer, the period window detector, and the logic device comprise field programmable gate array elements.

14. The demodulator according to claim 1 wherein the logic device comprises an "OR" gate.

15. The demodulator according to claim 1 wherein the communications signal includes a phase-shifted modulated mode and a generally unmodulated carrier mode, the demodulator further comprising a carrier boundary detector for detecting at least one of said modes to suppress noise outside of the phase-shifted modulated mode.

16. The demodulator according to claim 15 wherein the carrier boundary detector comprises a carrier duration timer and a logic storage device coupled to said carrier duration timer, the logic storage device having a latchable output for enabling or disabling an output of the demodulator.

17. The demodulator according to claim 16 wherein the timer has a first fixed predetermined duration corresponding to a duration of a leading carrier interval preceding the modulated mode and a second fixed predetermined duration corresponding to a duration of a trailing carrier interval following the modulated mode, and wherein the carrier boundary detector disables the output of the demodulator upon expiration of the second fixed predetermined duration to reduce the effects of noise associated with the communications signal.

18. A field programmable gate array demodulator for demodulating a phase-shift keyed signal containing a message, the demodulator comprising:
   a synchronizer for accepting a phase-shift keyed modulated signal and for outputting a transition signal, the transition signal including a series of pulses generated in response to reference edges of the phase-shift keyed modulated signal;
   a period-window detector coupled to the synchronizer for receiving the transition signal, the period window detector measuring the time interval between successive ones of the pulses generated, the period-window detector having a plurality of outputs indicative of a potential phase shift in the phase-shift keyed modulated signal based upon the measured time interval;
   a phase shift toggle circuit providing a demodulated data output, the phase shift toggle circuit adapted to receive the transition signal from the synchronizer and adapted to change the demodulated data output from a first state to a second state if the time interval falls within a predetermined window period for a predetermined fixed duration; and
   a carrier boundary detector for detecting a beginning and an end of the message and providing an output for disabling the demodulated data output after a trailing unmodulated carrier signal following the end is detected.

19. A method of demodulating a phase-shift keyed communications signal with a demodulator having a logic device, the method comprising the steps of:
   synchronizing the demodulator with the communications signal by generating a transition signal modulated to represent reference edges of the communications signal;
   measuring a time interval between the reference edges of the communications signal;
   establishing a durational state associated with the measured time interval; and
   applying the durational state to the logic device to yield a logic output signal indicating the presence or absence of a phase shift in the communications signal.

20. The method according to claim 19 further comprising the step of detecting an unmodulated carrier state of the communications signal and controlling an output of the demodulator based upon whether the communications signal is in an unmodulated carrier state or a modulated state.

21. The method according to claim 19 further comprising the step of:

timing a first fixed predetermined duration corresponding to a duration of a leading carrier interval preceding a modulated mode of the communications signal to identify an imminent arrival time of a message body to prepare for enabling an output of the demodulator.

22. The method according to claim 19 further comprising the steps of:

timing a second fixed predetermined duration corresponding to a duration of a trailing carrier interval following the modulated mode of the communications signal; and disabling an output of the demodulator upon expiration of the second predetermined duration to reduce the effects of noise associated with the communications signal.

23. The method according to claim 19 wherein the measuring step further comprises:

counting the time between successive transition signal pulses of the transition signal to establish the time interval.

24. The method according to claim 19 further comprising the step of:

detecting a phase change of the communications signal manifested by a measured time interval less than a minimum predetermined threshold time, the predetermined threshold time being proportional to a carrier frequency of the communications signal.

25. The method according to claim 19 further comprising the step of:

detecting a phase change of the communications signal manifested by a measured time interval greater than a maximum predetermined threshold time, the predetermined threshold time being proportional to a carrier frequency of the communications signal.

* * * * *